United States Patent [19]
Fisher et al.

[11] Patent Number: 5,609,216
[45] Date of Patent: Mar. 11, 1997

[54] MOBILE BASE HAVING LEG ASSEMBLIES WITH TWO WHEELS

[75] Inventors: David E. Fisher, Roanoke; John M. Holland, Shawsville; Kenneth F. Kennedy, Roanoke, all of Va.

[73] Assignee: Cybermotion, Inc., Salem, Va.

[21] Appl. No.: 396,918

[22] Filed: Mar. 1, 1995

[51] Int. Cl.$^6$ .................................................. B62D 61/10
[52] U.S. Cl. ........................... 180/24.03; 180/267; 901/1
[58] Field of Search ..................................... 180/210, 211, 180/212, 213, 214, 167, 168, 169, 252, 267, 22, 24.03, 24.04; 901/1

[56] References Cited

U.S. PATENT DOCUMENTS

| 4,573,548 | 3/1986 | Holland | 180/211 |
| 4,657,104 | 4/1987 | Holland | 180/211 |
| 4,683,973 | 8/1987 | Honjo et al. | 180/252 |
| 5,046,914 | 9/1991 | Holland et al. | 414/706 |

*Primary Examiner*—Kevin Hurley
*Attorney, Agent, or Firm*—Ware, Fressola, Van Der Sluys & Adolphson

[57] ABSTRACT

A mobile base for moving on a surface is provided having a driving and steering unit and a plurality of wheel assemblies. The driving and steering unit provides a drive force and a steering force. Each wheel assembly has a wheel assembly axis, and also has a steering column, concentric drive shafts, and two wheels. The concentric drive shafts respond to the drive shaft force, and provide a concentric drive shaft force. The steering column responds to the steering force, and provides a steering column force. The two wheels respond to the steering column force and rotate in the same direction for pivoting the steering column means about the wheel assembly axis. The two wheels respond to the concentric drive shaft force and rotate in the opposite directions to move the mobile base forwards or backwards along the surface.

12 Claims, 3 Drawing Sheets

MOBILE BASE HAVING LEG ASSEMBLIES WITH TWO WHEELS

TECHNICAL FIELD

The present invention relates to a mobile base (also called carriage systems) used to form mobile platforms upon which robots or other manipulative, observational, or monitoring devices may be placed for independently moving devices along a surface.

BACKGROUND OF THE INVENTION

Many different mobile robots are known in the art such as autonomous mobile robots and conventional, operator-driven vehicles. Autonomous mobile robots typically have different mobility requirements than conventional, operator-driven vehicles. These differences are dictated by the need for simple control, and by the nature of the interior environments in which they must operate, typically offices and warehouses with narrow aisles. Many nuclear applications also have narrow aisles with tight corners and dead ends. In these environments, a vehicle must be able to turn within its own footprint and must have good odometry for measuring the distance traveled. If the vehicle's controlling computer cannot estimate its movement from its drive system encoders, it will require expensive gyroscopes and/or inertial sensors for navigation. The vehicle must also negotiate bumps and ramps, and operate without damaging floor surfaces.

During the early 1980s, as research into autonomous robots intensified, mobile robots having a synchronous drive train gained popularity, also known in the art as Synchro-drive. With Synchro-drive mobile robots, all wheels of the vehicle steer and drive synchronously. All wheels turn in unison and trace parallel, equal length paths to each other. The platform does not rotate as the wheels steer, so it remains in the same orientation regardless of its direction of movement. A turret flange at the top center of the mobile robot rotates in unison with the steering and accommodates a subturret that turns in the direction of the forward motion of the mobile robot. A Synchro-drive mobile robot can thus follow any path geometry.

Synchro-drive mobile robots have many advantages. For example, the most important advantages are: excellent odometry, excellent traction, zero turning radius and high maneuverability, low destructive forces on floor (when properly implemented), ease of control and efficiency. In mobile robots having Synchro-drive, all wheel driving forces are perpetually parallel, providing excellent traction and accurate measurement of relative motion (odometry). Because all wheels are driven by the same motor, the vehicle does not lose traction as its weight shifts from one wheel to another (a common failure of alternative designs). Most importantly, Synchro-drive exhibits far less coupling between driving and steering forces than other competitive techniques. This characteristic minimizes heading errors that can be induced by bumps and slippage. With steering and drive decoupled, control is a simple matter of applying polar geometry. Moreover, in mobile robots having Synchro-drive, the platform does not rotate as it executes a turn, so the angle between the turret and the base can serve as a relative heading reference. This effect, combined with the fact that all wheels move synchronously with respect to each other and must therefore execute equal length paths, causes the platform to drive a straight line with little arcing. The reason for this is that in order to arc (without steering movement), the wheels on the outside of the curve would be forced to travel further than those on the inside, and they cannot do so without skidding.

Finally, because there are extremely small counteracting forces in a Synchro-drive mobile robot, it does not waste precious battery energy fighting its own movement. This results in vehicles which can patrol continuously for as many as 24 hours. Since its introduction in the early 1980's, the Synchro-drive mobile robot has gained widening acceptance as an optimal mobility technology for mobile robots.

U.S. Pat. No. 4,573,548 is an example of a first generation Synchro-drive mobile robot which uses two horizontal belts or chains. As shown in FIG. 15 of U.S. Pat. No. 4,573,548, one chain couples the drive motor to the wheel assemblies which are spaced evenly around the base of the mobile robot, and a second chain couples the steering motor to the wheel assemblies. The first generation mobile robot was controlled by remote control. Because the drive chains introduced unacceptable odometry errors, the first generation machine was not controlled autonomously. The subject matter of U.S. Pat. No. 4,573,548 is assigned to the assignee of the instant application, and hereby incorporated by reference.

In other first generation machines, prototypes have also been constructed with pinion gears arranged in rows to carry driving and steering forces from a central mover to the wheels. These systems suffer from excessive accumulated backlash and have never become popular.

U.S. Pat. No. 4,657,104 is an example of a second generation Synchro-drive mobile robot. As shown in FIG. 27 of U.S. Pat. No. 4,657,104, the second generation mobile robot has a three-wheel Synchro-drive platform with a steering and drive shaft system which are concentrically arranged to replace the chains.

In the second generation Synchro-drive mobile robot, each wheel assembly has one wheel mounted to the side of its respective "foot", which is mechanically geared so that the wheel rolls around the foot during steering to avoid destructive and power consuming twisting under the center of the foot. The gearing therefore acts as a mechanical adder which provides the rotational drive to each wheel. This action is defined by the following equation of motion: $\omega_W = R(\omega_D - \omega_S)$ where:

$\omega_W$=Angular velocity of wheel $\omega_D$=Angular velocity of drive shaft $\omega_S$=Angular velocity of steering R=r'/r=A/B r'=Wheel offset from steering pivot r=Radius of wheel A=No. of teeth on power shaft gear B=No. of teeth on wheel shaft gear The design of the second generation Synchro-drive mobile robot causes the wheels to protrude from under the body at one extreme so as not to be dangerously close to the center of gravity at the opposite orientation. The result is that the second generation Synchro-drive mobile robot has a clearance (worst case) of 32.75 inches (83cm), allowing it to narrowly pass through a standard 36 inch door. When the second generation Synchro-drive mobile robot performs a tight maneuver such as going through a 36 inch door, it must carefully measure the door with its sonar, and then adjust its path laterally to compensate for its footprint (which it calculates from the angle between the base and turret).

Since 1984, over 60 of these vehicles have been placed in operation around the world in military, industrial, research, security, building monitoring, and nuclear applications. Since 1990, Synchro-drive mobile robots have been in routine commercial service in security, material handling and nuclear applications. The subject matter of U.S. Pat. No. 4,657,104 is assigned to the assignee of the instant application, and hereby incorporated by reference. The second generation mobile robots has been sold under the name Navmaster™ and Cyber-Guard™ by Cybermotion.

One disadvantage of the second generation Synchro-drive mobile robot is that the forces around the base and around each foot are not perfectly symmetrical. When the mobile robot accelerates or decelerates, an unbalanced torque force is placed on the steering axis. The imbalance dictates that the steering system backlash be very small to maintain good odometry.

Despite its wide spread acceptance, the second generation Synchro-drive mobile robot has another disadvantage of being unable to control the base orientation. This fact, combined with the asymmetry of a three-wheeled platform, means that in any direction of movement, a wheel assembly may be straight out to one side (the worst case for lateral clearance) or straight out to the other side, or at any position in between.

SUMMARY OF THE INVENTION

The invention provides a mobile base for moving on a surface, having driving and steering means and three wheel assemblies. The driving and steering means provides a drive force and a steering force to the three wheel assemblies. Each wheel assembly has a wheel assembly axis, and also has steering column means, concentric drive shaft means, and two wheels. The steering column means responds to the steering force, and provides a steering column force. The concentric drive shaft means responds to the drive shaft force, and provides a concentric drive shaft force. The two wheels respond to the steering column force, and rotate in the same direction to pivot the steering column about the respective wheel assembly axis. The two wheels respond to the concentric drive shaft force and rotate in the opposite directions to move the mobile base forwards or backwards along the surface.

The two wheel design effectively eliminates the stability problem encountered in the second generation prior art machine, allows each wheel assembly to be made shorter, so the mobile robot has a smaller footprint with a significantly narrower clearance (27.125 inches/68.9 cm), enables a lower center of gravity, and provides substantially improved stability.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWING

For a fuller understanding of the nature and objects of the invention, reference should be made to the following detailed description taken in connection with the accompanying drawings, in which.

BEST MODE OF THE INVENTION

Figure 1:
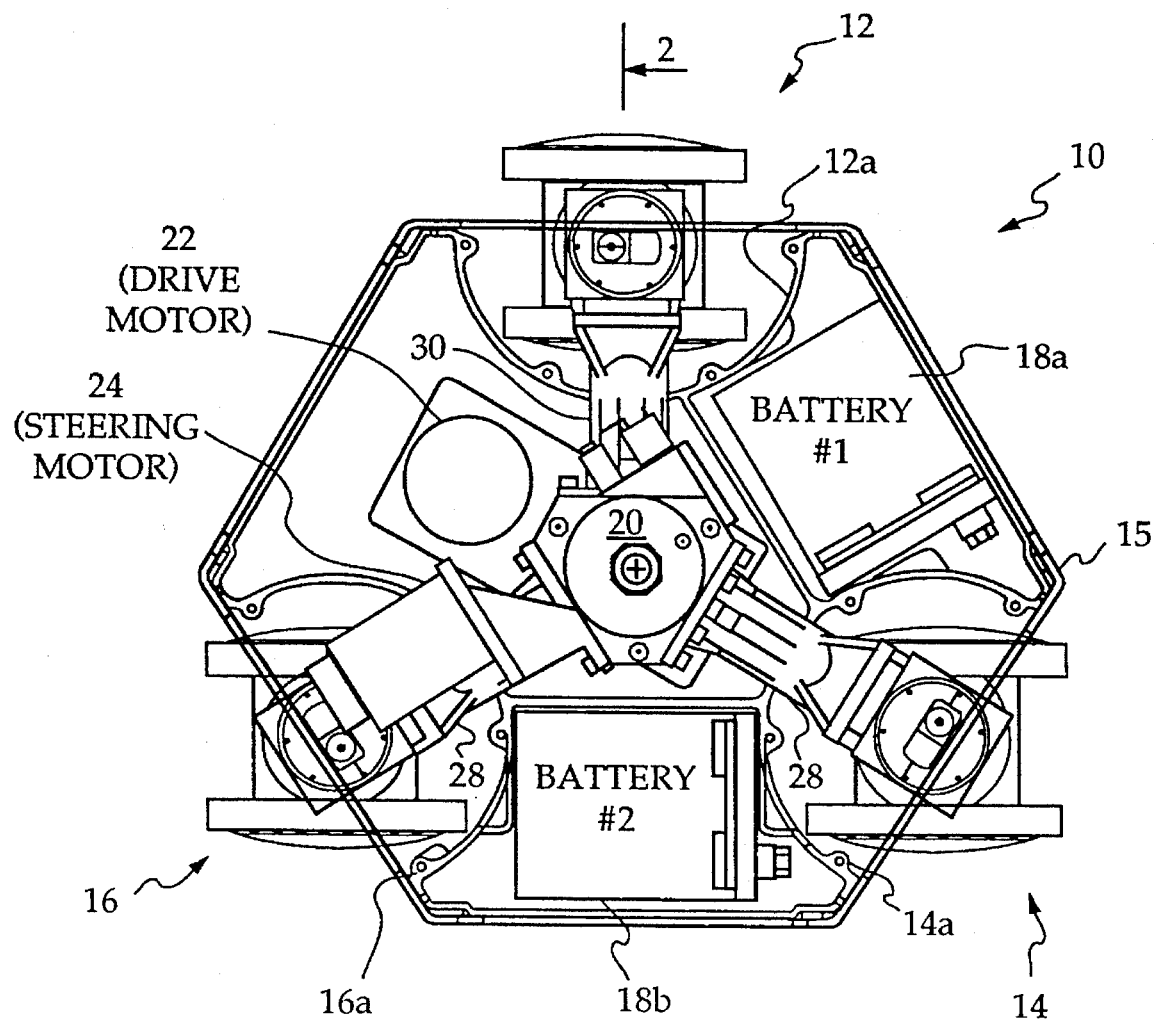
FIG. 1 shows a top-down cross-sectional view of a mobile base of the present invention.
Figure 2:
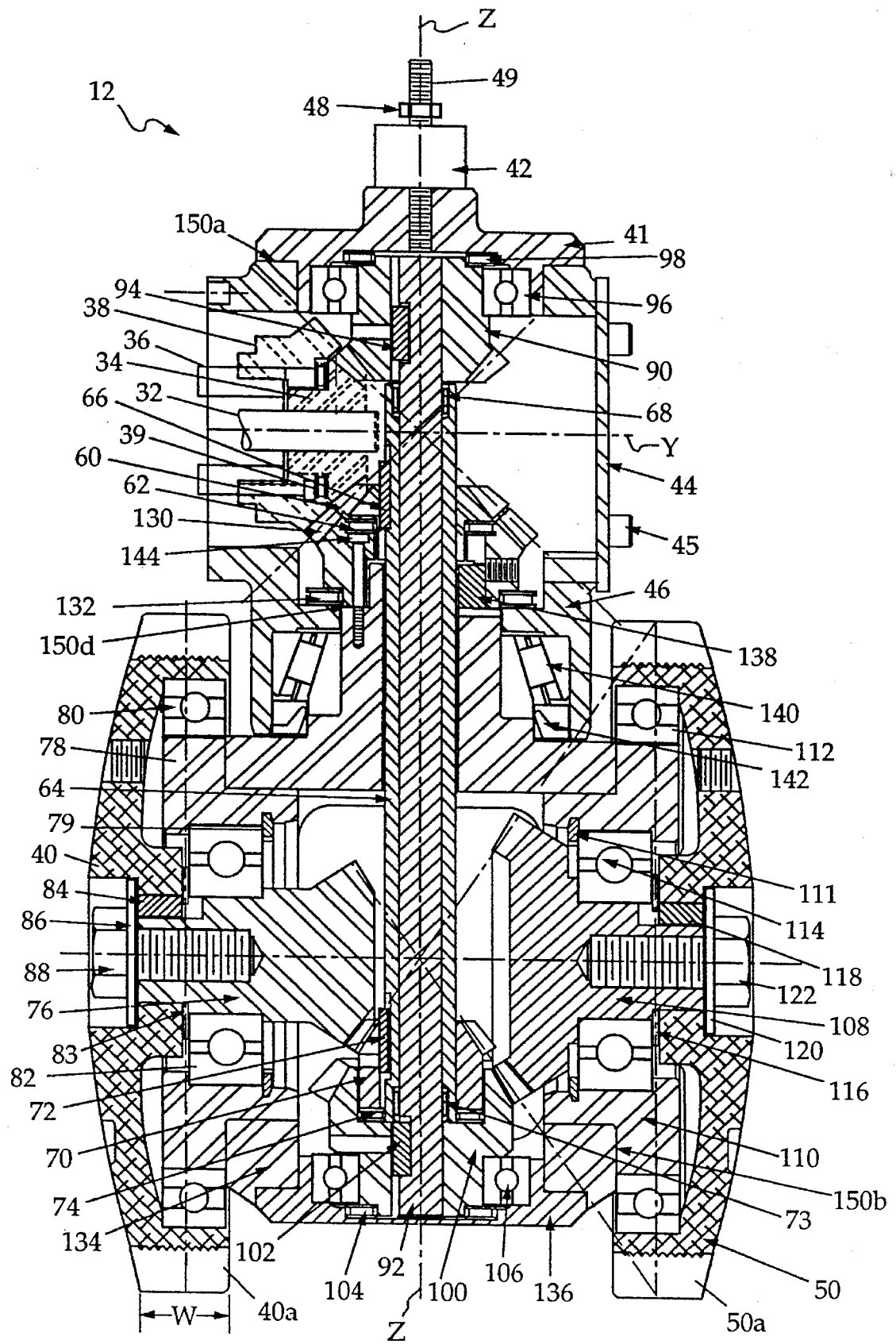
FIG. 2 shows a side cross-sectional view along the arrow 2 of one leg assembly of the mobile base shown in FIG. 1.

FIG. 1 shows a mobile base 10 having a plurality of wheel assemblies 12, 14, 16 each arranged inside a respective wheel assembly housing 12a, 14a, 16a. (Each wheel assembly 12, 14, 16 is also known herein as a foot.) The wheel assemblies 12, 14, 16 are connected to driving and steering means generally indicated as 20 mounted to a housing 15 of the mobile base 10. The driving and steering means 20 has a drive motor 22, a steering motor 24, three drive and steering legs 26, 28, 30. One drive and steering leg 30 has a main drive shaft 32, a main bevelled drive gear 34, a steering shaft 36 and a main bevelled steering gear 38, as shown in FIG. 2, as discussed below. The thrust bearing and washer 39 separates the main bevelled drive gear 34 and main bevelled steering gear 38. The driving and steering means 20 also has two batteries 18a, 18b disposed inside the housing 15 for providing power to the driving motor 22 and the steering motor 32. The driving and steering means 20 is known in the art, for example, see U.S. Pat. No. 4,657,104, hereby incorporated by reference.

FIG. 2 shows the wheel assembly 12 being connected to the housing shown in FIG. 1 by a pinion bearing cartridge 41, a sandwich mount 42, a cover plate 44, a knee portion 46, a nut 48 and bolt 49. The bolt 49 is part of the sandwich mount 42; the nut 48 fastens the base to the assembly housing 12a, 14a, 16a by means of an adapter casting not shown in the drawing.

Concentric Drive Shaft Means

As shown in FIG. 2, the wheel assembly 12 includes concentric drive shaft means having a left-hand drive shaft means and a right-hand drive shaft means which are concentrically arranged with respect to one another for imparting respective drive forces that simultaneously rotate a left wheel 40 and a right wheel 50 in the opposite directions to move the mobile base 10 forwards or backwards along the surface. (For the purpose of clarification, when using the term "opposite" it is important to point out that the wheels rotate in the opposite directions when viewed from the rightside and then the leftside, i.e. clockwise and counterclockwise, but rotate in the same direction with respect to their common axis.) The left-hand drive shaft means rotates the left wheel 40, and the right-hand drive shaft means rotates the right wheel 50.

As shown in FIG. 2, the left-hand drive shaft means includes a bevelled drive gear 60 seated on a thrust bearing and washer 62, and coupled to a left-hand pinion shaft 64 by a left-hand pinion shaft key 66. In an alternative embodiment, miter gears are used, i.e. 1:1 ratio bevelled gears. The left-hand pinion shaft 64 rotates outside needle bearings 68, 73, and is connected to a left-hand bevelled pinion 70 by a left-hand pinion shaft key 72. The left-hand bevelled pinion 70 is seated on a thrust bearing washer 74, and connected to a left-hand bevelled wheel gear 76. The left-hand bevelled wheel gear 76 is arranged in a left wheel bearing cartridge 78, and rotationally supported by ball bearings 80, 82, as shown. A thrust washer 83 is arranged between the ball bearing 82 and the left wheel 40. The wheel 40 is connected to the left-hand bevelled wheel gear 76 by a left wheel key 84, a left wheel washer 86 and a left wheel screw 88.

The right-hand drive shaft means is designed in a similar manner as the left-hand drive shaft means. For example, a bevelled drive gear 90 is connected to a right-hand pinion shaft 92 by a right-hand pinion shaft key 94, and rotates inside a ball bearing 96 and on a thrust bearing and washer 98. The right-hand pinion shaft 92 rotates about the needle bearings 68, 73, and is connected to a right-hand bevelled pinion 100 by a right-hand pinion shaft key 102. The right-hand bevelled pinion 100 is seated between a thrust bearing and washer 104 and the thrust bearing and washer 74, rotates inside a ball bearing 106, and is coupled to a right-hand bevelled wheel gear 108. The right-hand bevelled wheel gear 108 is arranged in a right wheel bearing cartridge 110, and rotationally supported by ball bearings 112, 114. A thrust washer 116 is seated between the right wheel 50 and the ball bearing 114. The right-hand bevelled wheel gear 108 is connected to the right wheel 50 by a right wheel key 118, a right wheel washer 120 and a right wheel screw 122.

In the drive shaft means, the pair of bevelled drive gears 60 and 90 mechanically couples the wheel assembly 12 to the main bevelled drive gear 34 of the drive shaft 32 connected to the drive means 20 (FIG. 1). The gear ratio of the left-hand bevelled pinion 70 and the left-hand bevelled wheel gear 76 is substantially equal to the gear ratio of the right-hand bevelled pinion 100 and the right-hand bevelled wheel gear 108, so the left and right wheels 40, 50 can rotate equally in the opposite directions to drive the mobile base forwards or backwards on a surface (not shown) or in the same direction to pivot the wheel assembly about the wheel assembly axis Z. The equation of motion of the two wheels 40, 50 is described below.

In operation, the main bevelled drive gear 34 of the drive shaft 32 (FIG. 2) drives the pair of bevelled drive gears 60 and 90 in opposite rotational directions with respect to the wheel assembly axis through the concentric drive shafts 64 and 92, attached respectively to the left-hand bevelled pinion 70 and the right-hand bevelled pinion 100, causing both the left wheel 40 and the right wheel 50 to rotate in opposite rotational directions.

Steering Column Means

The wheel assembly 12 includes a steering column means that is concentrically arranged with respect to the concentric drive shaft means, as shown in FIG. 2. The steering column means rotates the wheels 40, 50 in the same direction to pivot the steering column means about a wheel assembly axis Z with respect to the housing 15 of the mobile base 10. (For the purpose of clarification, when using the term "same" it is important to point out that the wheels rotate in the same direction when viewed from the rightside and then the leftside, i.e. clockwise and counterclockwise, but rotate in the opposite direct with respect to their axis.) The steering column means includes a bevelled steering gear 130, a thrust bearing and washer 132, the above-mentioned thrust bearing and washer 62, a foot housing 134, a bottom pinion bearing cartridge 136, a foot housing key 138, a tapered roller bearing 140, a seal 142 and a socket screw 144. The bevelled steering gear 130 couples the wheel assembly 12 to the main bevelled steering gear 38 of the steering shaft 36 connected to the steering means 30 (FIG. 1). In operation, the main bevelled steering gear 38 drives the bevelled steering gear 130 which turns the foot housing 134 causing it to rotate or pivot clockwise or counterclockwise about the wheel assembly axis Z. As the foot housing 134 rotates, the left and right wheels 40 and 50 are caused to rotate in the same directions about the wheel assembly axis due to the reflex action of the left-hand bevelled wheel gear 76 and the right-hand bevelled wheel gear 108, respectively.

Wheel Means

In the wheel assembly 12, the two wheels 40, 50 rotate in a locked relationship rotating in the same direction when steering the mobile base and rotating in opposite directions when driving the mobile base 10. In effect, all six wheels on the wheel assemblies 12, 14, 16 remain locked when driving the mobile base 10, and separately counter-rotate when steering the mobile base 10. The locking action when driving the mobile base 10 is accomplished without differentials, so all six wheels remain mechanically locked to the drive motor 22 in FIG. 1. The synchronization is essential to prevent traction loss on uneven surfaces, if either wheel 40 or 50 of a pair leaves the floor. The use of a common drive axle between wheels 40, 50 on the wheel assembly 12 would not allow turning. Moreover, a differential between the wheels, the use of one idler, or a ratchet drive on the wheels, while allowing turning, would greatly reduces odometry accuracy and control. Because of this, such designs are not practical. Additionally, the dual wheel design in the mobile base 10 provides balanced steering and driving forces around each wheel assembly and improved overall odometry.

As discussed above, the invention uses bevelled drive and steering gears 34, 38 and concentric drive and steering shafts 32, 36 which is known in the prior art second generation Synchro-drive mobile robot to deliver drive and steer forces to each wheel assembly via cast "leg tubes". However, in contrast to the prior art second generation Synchro-drive mobile robot, the mobile base 10 provides within each wheel assembly a slip-free mechanical "adder" that adds positive drive movement to one wheel 40 and an equal negative movement to the other wheel 50 of the pair in proportion to steering movement of the wheel assembly 12. The equation for motion of the two wheels is therefore:

$$\omega_{W1} = R(\omega_D - \omega_S)$$

$$\omega_{W2} = R(\omega_D + \omega_S)$$

Where:

$\omega_{W1}$ = Angular velocity of Wheel 1

$\omega_{W2}$ = Angular velocity of Wheel 2

Table 1 provides a list of all the parts for the wheel assembly 12 shown in FIG. 2.

TABLE 1

| No. | DESCRIPTION |
|---|---|
| 12 | Wheel Assembly |
| 32 | Main Drive Shaft |
| 34 | Main Drive Gear |
| 36 | Main Steering Shaft |
| 38 | Main Steering Gear |
| 39, 62, 74, 83 98, 104, 132 | Thrust Bearings and Washers |
| 40, 50 | Wheels |
| 40a, 50a | Tires |
| 41 | Top Pinion Bearing Cartridge |
| 42 | Sandwich Mount |
| 44 | Cover Plate |
| 45 | Socket screw |
| 46 | Knee |
| 48 | Nut |
| 49 | Bolt |
| 60 | Top Drive Left-Hand Gear |
| 64 | Left Pinion Shaft |

TABLE 1-continued

| No. | DESCRIPTION |
|---|---|
| 66, 72 | Left-Hand Pinion Shaft Keys |
| 68, 73 | Needle Bearings |
| 70 | Bevelled Left-Hand Pinion |
| 76 | Bevelled Left-Hand Gear |
| 78, 110 | Wheel Bearing Cartridges |
| 79, 111 | Truarc Retaining Rings |
| 80, 82, 96, 106, 112, 114 | Ball Bearings |
| 84, 118 | Wheel Keys |
| 86, 120 | Wheel Washers |
| 88, 122 | Wheel Screw |
| 90 | Top Right-Hand Drive Gear |
| 92 | Right Pinion Shaft |
| 94, 102 | Right-Hand Pinion Shaft Keys |
| 100 | Bevelled Right-Hand Pinion |
| 108 | Bevelled Right-Hand Gear |
| 130 | 30-Tooth Steer Gear |
| 134 | Foot Housing |
| 136 | Bottom Pinion Bearing Cartridge |
| 138 | Foot Housing Key |
| 140 | Tapered Roller Bearing |
| 142 | Harwall Seal |
| 144 | Socket Screw |
| 150a–150d | Special Shims |

Advantages of the Invention

The invention has several advantages over the known prior art, including the second generation Synchro-drive mobile robot, as follows: a smaller footprint, improved stability, improved odometry, improved traction, reduced scuffing.

The smaller footprint and improved stability are derived from the fact that since there is a wheel on each side of the wheel assembly, the respective leg supporting each wheel may be made shorter without compromising stability. The improved clearance allows the mobile base 10 to easily travel through areas such as aisles as narrow as 36 inches, and it travels faster in areas that would challenge the second generation machine.

Since the driving forces of the wheels 40, 50 are equal, the odometry of the invention benefits from the fact that forces around a wheel assembly are balanced in both acceleration and deceleration. Furthermore, the mobile base 10 is truly a six-wheel drive vehicle, giving it substantially improved traction compared to the prior art mobile base.

As shown in FIG. 2, the wheels 40, 50 each have a tire 40a, 50a respectively with a width W. Another advantage gained by using the dual wheel design is that the width W of each tire 40a, 50a is only about 60% as wide as the tire used in the prior art second generation Synchro-drive mobile robot (see FIG. 3). Since the weight of the mobile base 10 is distributed on six tires, there is less pressure per square inch on each tire even at the reduced width W. As a tire turns around the wheel assembly 12, the gear ratio discussed above is set to cause the center of the tire to turn at the proper rate to traverse the steering circle. However, since the outside and inside edges of the tires 40a, 50a are at slightly different distances from the center of turning, distortion of the tire and some scuffing may still occur, although significantly less than the prior art design.

Both the prior art second generation Synchro-drive mobile robot and the mobile base 10 use a tire material having a hardness of about 70 durometer. The choice of the tire material is determined by the type of surface on which the mobile base 10 moves, for example, concrete, wood. Embodiments are envisioned with tires having a material with a hardness of 90 durometer, although the invention is not intended to be limited by the choice of the tire material. In the prior art second generation Synchro-drive mobile robot, it has been found that a mobile robot operating continuously for several years will begin to form a crowned surface on the tire due to excess wear on the edges. The reduction of the width W of the tires 40a, 50a of the dual wheel design of the mobile base 10, combined with the lower pressure per square inch, significantly reduces this undesirable tire wear, which reduces maintenance, costs and improves reliability.

Figure 3:
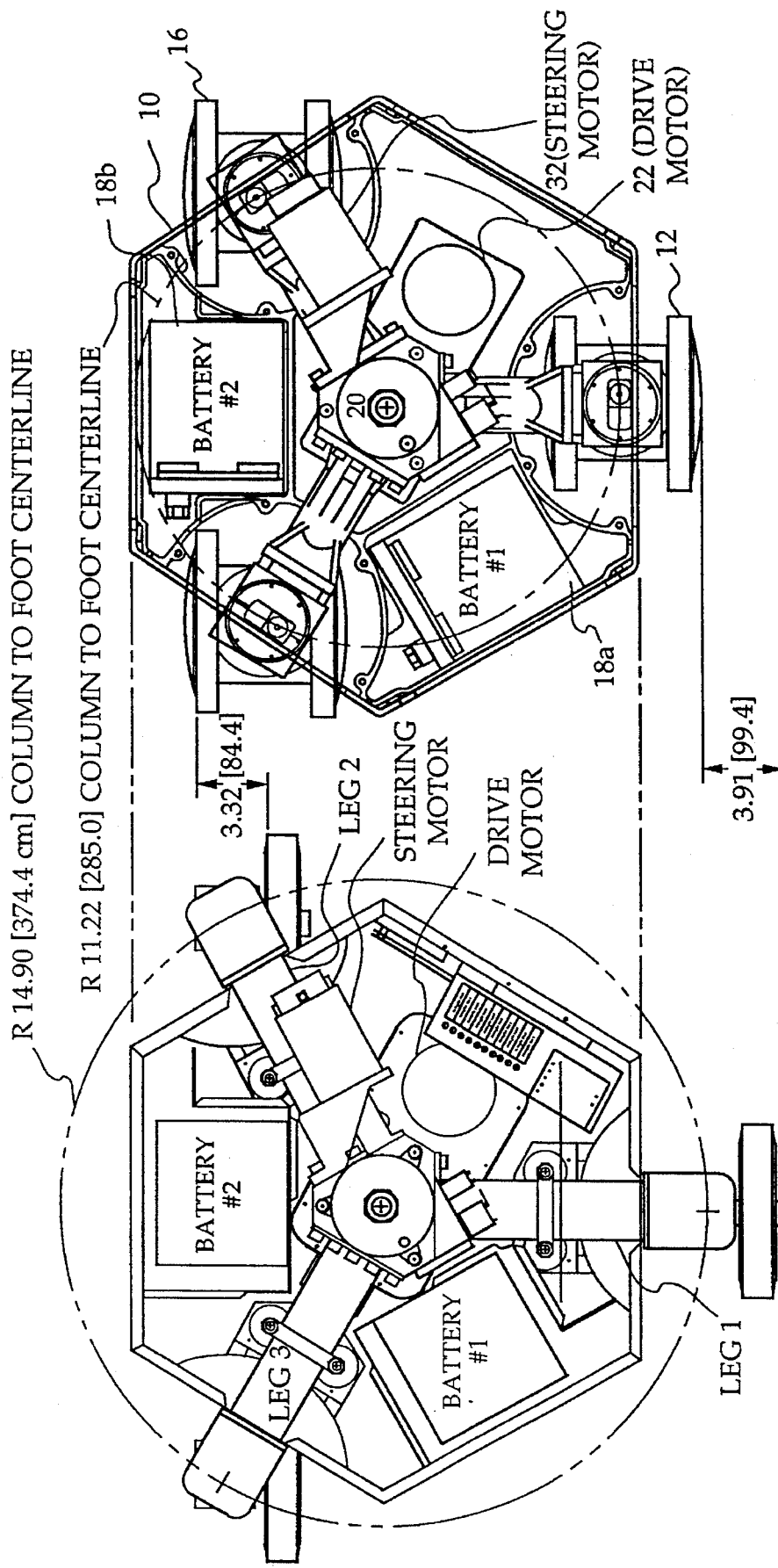
FIG. 3 shows a top-down view of the second generation prior art mobile base (left) side-by-side with the mobile base shown in FIG. 1 (right).

FIG. 3 shows the mobile base unit 10 in FIG. 1 side-by-side with the prior art second generation Synchro-drive mobile base unit shown in FIG. 15 of U.S. Pat. No. 4,657, 104. FIG. 3 makes clear that the mobile base 10 has a more compact design than the prior art second generation Synchro-drive mobile, which is a direct result of the dual wheel design. For example, as shown, the column-to-foot centerline radius for the mobile base of the invention (right side) is 11.22 inches, whereas the column-to-foot centerline radius for the prior mobile robot (left side) of the invention is 14.90 inches. In addition, the width of the mobile base 10 is 3.91 inches less than the width of the prior art second generation mobile robot.

The invention provides an improved mobile base for navigating and inspecting narrow aisles in warehouses and is also useful for navigating aisles having drums of lower level nuclear waste, as well as for a mobile detection, assessment, and response system.

The wheel assemblies 14 and 16 are similarly designed, and for that reason are not discussed in detail. It is also important to note that the wheel assembly includes shims 150a, 150b, 150c, 150d, which are used as needed.

It will thus be seen that the objects set forth above, and those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween. It should also be understood that features described with respect to one embodiment may be used as features in another embodiment.

We claim:

1. A mobile base for moving on a surface, comprising:
    driving and steering means, for providing a drive shaft force and for further providing a steering force; and
    a plurality of wheel assembly means for supporting and moving the mobile base, each having a wheel assembly axis, and each wheel assembly means having
        concentric drive shaft means, responsive to the drive shaft force, for providing a concentric drive shaft force; and
        steering column means, responsive to the steering force, for providing a steering column force;
        wheel means having a first and a second wheel contacting the surface, responsive to the steering column force, for rotating the first and second wheels in the same direction to pivoting the steering column means about the wheel assembly axis, and also responsive to the concentric drive shaft force, for rotating the first and second wheels in the opposite directions for moving the mobile base forward or backwards on the surface.

2. A mobile base according to claim 1, wherein said concentric drive shaft means includes opposing concentric drive pinion shaft means having two bevelled drive gears, two opposing concentric pinion shafts and two bevelled pinions, for providing opposing concentric drive shaft forces, said two bevelled drive gears being coupled by drive shaft keys to said two opposing concentric pinion shafts, said two opposing concentric pinion shafts being coupled by pinion shaft keys to said two bevelled pinions.

3. A mobile base according to claim 1, wherein the steering column means is concentrically arranged with respect to said concentric drive shaft means.

4. A mobile base according to claim 1, wherein the dual wheel means includes two wheels, each responsive to opposing concentric drive shaft forces, for rotating said two wheels with opposing synchronous movement about the respective wheel assembly axis.

5. A mobile base according to claim 1, wherein the driving and steering means includes a drive motor, a steering motor, three drive and steering legs; and wherein one drive and steering leg has a main drive shaft, a main bevelled drive gear, a steering shaft and a main bevelled steering gear.

6. A mobile base according to claim 1, wherein the concentrically drive shaft means includes a left-hand drive shaft means for imparting one respective drive shaft force to rotate the left wheel and a right-hand shaft drive means for imparting another respective drive shaft force to rotate the right wheel which are concentrically arranged with respect to one another.

7. A mobile base according to claim 6, wherein the left-hand drive shaft means includes at least a bevelled drive gear being coupled by a left-hand pinion shaft key to a left-hand pinion shaft, the left-hand pinion shaft being coupled by a left-hand pinion shaft key to a left-hand bevelled pinion, and the left-hand bevelled pinion being rotationally coupled to a left-hand bevelled wheel gear.

8. A mobile base according to claim 7, wherein the right-hand drive shaft means includes at least a bevelled drive gear being coupled by a right-hand pinion shaft key to a right-hand pinion shaft, the right-hand pinion shaft being coupled by a right-hand pinion shaft key to a right-hand bevelled pinion, and the right-hand bevelled pinion being rotationally coupled to a right-hand bevelled wheel gear.

9. A mobile base according to claim 8, wherein a gear ratio of the left-hand bevelled pinion 70 and the left-hand bevelled wheel gear 76 is substantially equal to a gear ratio of the right-hand bevelled pinion 100 and the right-hand bevelled wheel gear 108.

10. A mobile base according to claim 1, wherein the steering column means includes a bevelled steering gear, a foot housing, a bottom pinion bearing cartridge, a foot housing key, a tapered roller bearing, and a Harwall seal.

11. A mobile base according to claim 1, wherein the plurality of wheel assembly means includes three wheel assemblies, each arranged inside a respective wheel assembly housing of the mobile base.

12. A mobile base for moving about a surface, comprising:

housing means;

universal driving and steering assembly means arranged in said housing means for providing a driving torque and a steering torque, having main drive shaft means for providing the driving torque, and having main steer shaft means for providing the steering torque; and at least one wheel assembly, comprised of:

steering column means being rotationally coupled to said housing and said main steer shaft means, for providing a steering column force in response to the steering torque;

concentric drive shaft means for providing concentric drive shaft force including a first drive shaft force and a second drive shaft force in response to the driving torque, being rotationally coupled to the housing and said main drive shaft means, being coaxially arranged with respect to said steering column means, and having first drive shaft means and second drive shaft means for providing the first drive shaft force, said first drive shaft means coaxially arranged with respect to said second drive shaft means for providing the second drive shaft force; and dual wheel means being coupled to the steering column means, having a first wheel being rotationally coupled to the first drive shaft means for rotating in response to the first drive shaft force, and having a second wheel being rotationally coupled to the second drive shaft means for rotating in response to the second drive shaft force.

\* \* \* \* \*